United States Patent
Di Salvo et al.

[15] 3,686,497
[45] Aug. 22, 1972

[54] ADJUSTABLE HEADLAMP

[72] Inventors: Salvatore Di Salvo, Via Tirreno 165; Mario Collazuol, Via Isonzo 39, both of Turin, Italy

[22] Filed: July 9, 1971

[21] Appl. No.: 161,151

[52] U.S. Cl..............................240/61.8, 240/61.6
[51] Int. Cl..............................B60g 1/06
[58] Field of Search................240/61.6, 61.8, 61.9

[56] References Cited

UNITED STATES PATENTS 3,229,082   1/1966   Barron.................240/61.6 X Primary Examiner—Samuel S. Matthews
Assistant Examiner—Monroe H. Hayes
Attorney—Richard C. Sughrue et al.

[57] ABSTRACT

A headlamp adjusting device for motor vehicles is disclosed; the device is operable to adjust the inclination of the headlamps with respect to the horizontal to compensate for changes in angle of the vehicle under two different load conditions. The device comprises an adjustable support for one of the normal adjusting screws of the headlamp, the adjustable support being movable between two positions by means of a control member having two wedge section limbs which are moved between the adjustable support and a fixed member in one position of the control member to define one position of the headlamps, and moved out from between the adjustable support and the fixed member in the other position of the control member to define the other position of the headlamps, to which latter position the headlamp is biased by a spring.

4 Claims, 10 Drawing Figures

Patented Aug. 22, 1972 3,686,497

INVENTORS
SALVATORE DI SALVO
MARIO COLLAZUOL

BY Sughrue, Rothwell, Mion,
Zinn & Macpeak
ATTORNEYS

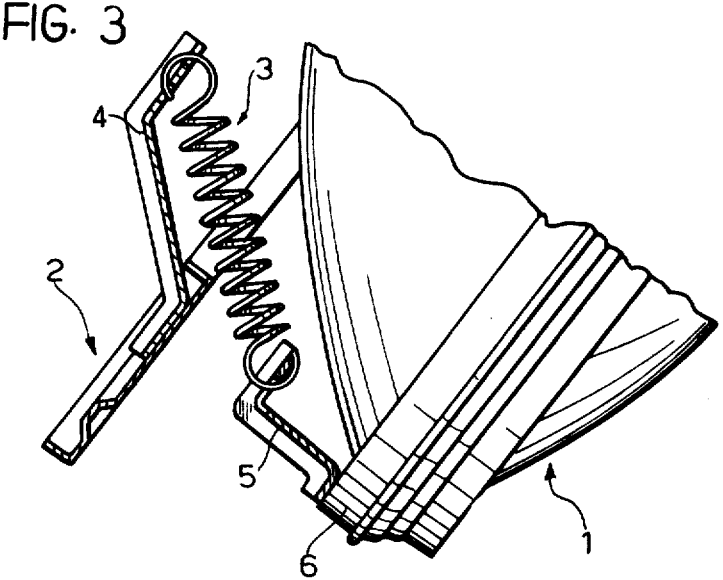
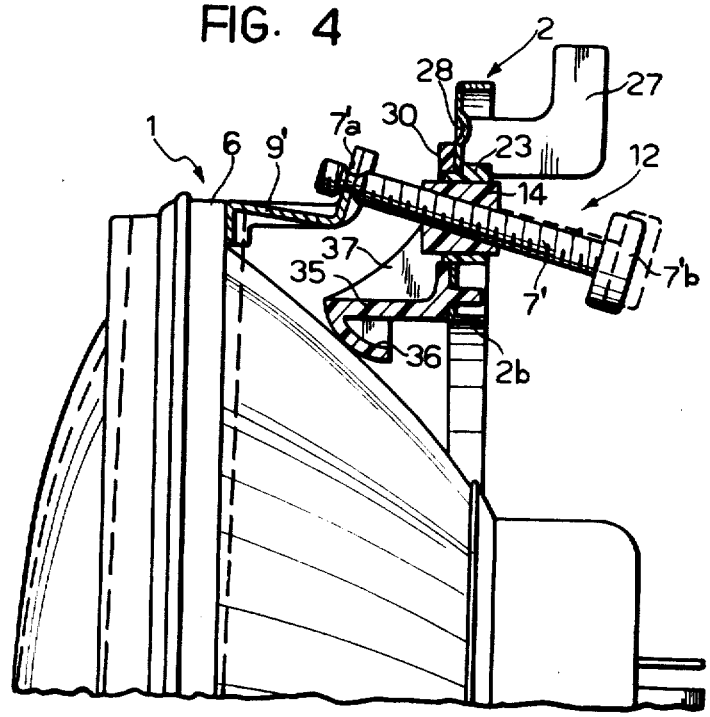

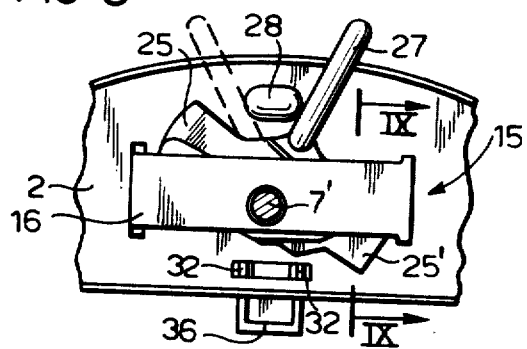
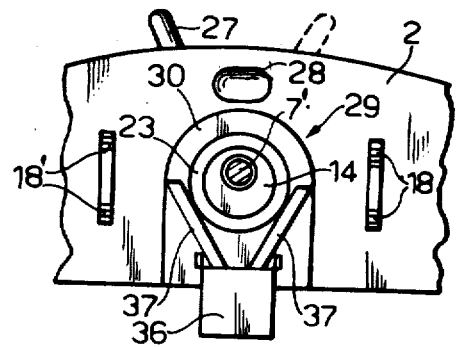
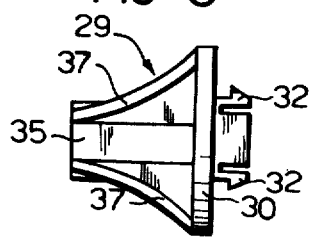
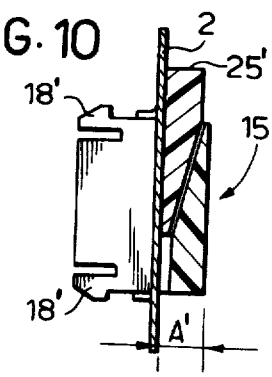
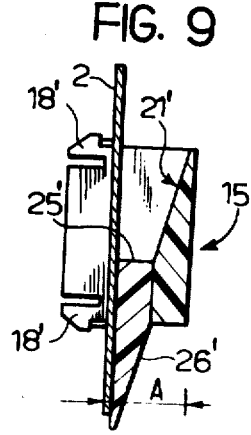

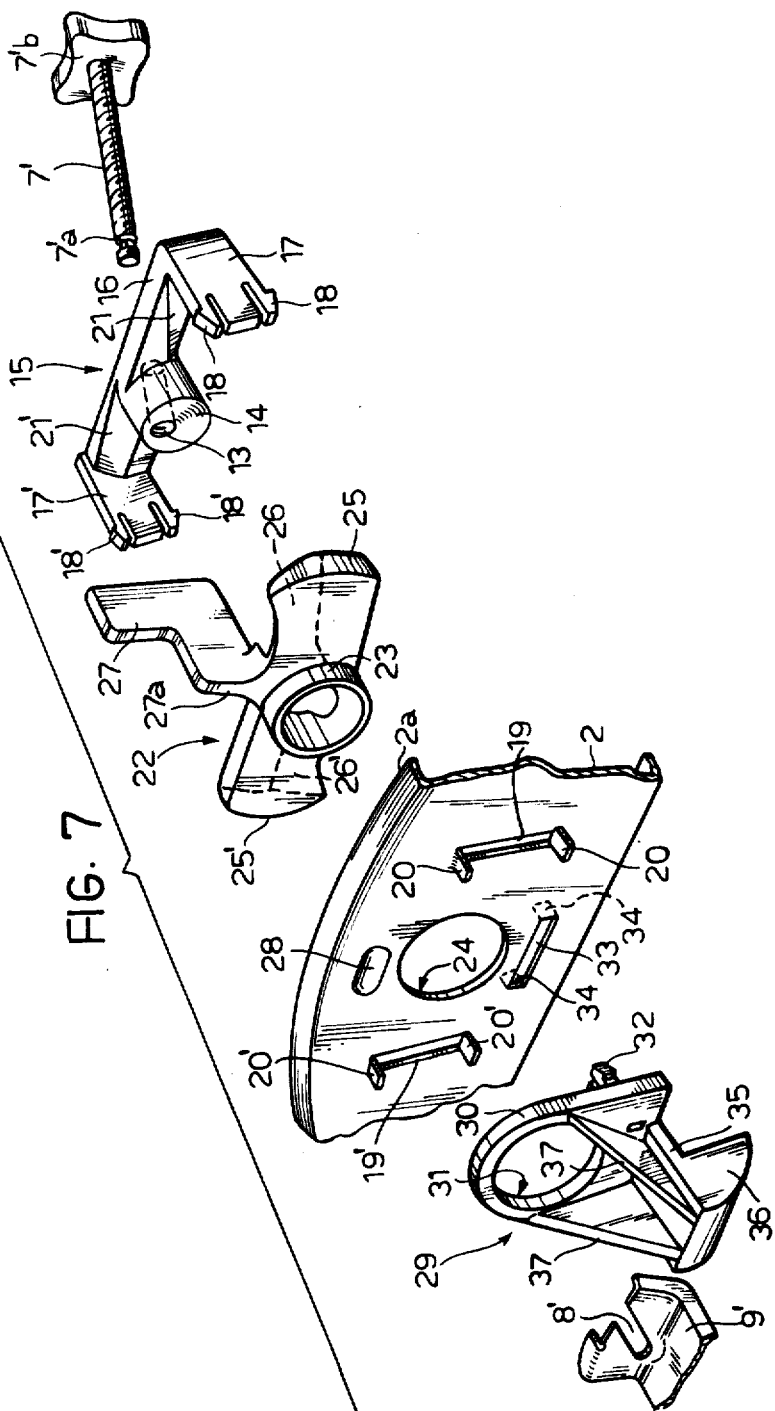

ADJUSTABLE HEADLAMP

BACKGROUND OF THE INVENTION

The present invention relates to devices for adjusting the inclination of the headlamps of motor vehicles to compensate for variations in the vehicle's angle due to changes in load.

It is well known that every alteration of the angle of the longitudinal axis of a motor vehicle due to changes in the load carried causes a variation in the angle of the light beams of the headlamps with respect to a horizontal plane and this variation has an adverse effect both on the dipped headlamp beams, the intensity of which can be changed to a considerable extent, and also on the main headlamp or driving beams which can dazzle the drivers of oncoming vehicles, if the rear of a vehicle is weighed down by the load, which is the usual effect of a heavy load.

The present invention finds particular utility in relation to headlamps of the type in which the optical system has a raised peripheral edge which bears three rearwardly extending spigots which effect connection of the optical system to an annular support plate rigidly mounted on the coachwork and which, by means of a return spring with two adjusting screws engaged in shaped blocks which snap-in to the said annular plate, permit adjustment of the optical system upon three convex supports which allow the optical system to be adjusted in any plane by adjustment of the adjusting screws.

OBJECTS OF THE INVENTION

It is an object of this invention to reduce these disadvantages and to provide a device by means of which it is possible to effect a predetermined adjustment in the angle of the headlamp for two different load conditions quickly and easily, and independently of the general headlamp adjustment which is carried out when the vehicle lamps are set up.

It is another object of this invention to provide a device which is very simple, sturdy and economical in construction, and should be simple and practical to handle, and reliable and accurate in operation.

SUMMARY OF THE INVENTION

According to the present invention there is provided a headlamp adjusting device for motor vehicle headlamps of the type having an optical system which is mounted on an annular support plate by three supports and adjustable in inclination with respect to the vehicle by means of two adjusting screws, the device being operable to adjust the inclination of the headlamps with respect to the horizontal to compensate for changes of inclination due to changes in load of the vehicle, and comprising a U-shaped support member which is slidably mounted for axial movement on the annular support plate and which has a threaded boss into which the adjusting screw which controls the inclination of the headlamp with respect to the horizontal is engaged, a rotatably mounted control member having two lateral projections which are wedge shaped in cross section being interposed between the said U-shaped support member and the annular support plate, the said lateral projections cooperating with the U-shaped support member such that rotation of the control member in one direction to a first operative position causes relative separation of the U-shaped support member and the annular support plate and rotation of the control member in the other direction to a second operative position allows relative approach of the said two support members thereby adjusting the position of the said adjusting screw engaged in the U-shaped support member to adjust the inclination of the headlamp with respect to the horizontal between two predetermined positions.

Various other features and advantages of the invention will become apparent from the following description given purely by way of example with reference to the drawings.

BRIEF DESCRIPTION OF THE DRAWINGS

FIGS. 2, 3, and 4 are partial axial sections of the embodiment of FIG. 1, taken on the lines II—II, III—III, and IV—IV respectively of FIG. 1;

FIG. 5 is a rear view of part of the embodiment of FIG. 1;

FIG. 6 is a front view of that part of the embodiment of FIG. 1 illustrated in FIG. 5;

FIG. 7 is an exploded perspective view of the embodiment of FIG. 1 on an enlarged scale;

FIG. 8 is a plan view of one of the elements of the embodiment of FIG. 1; and

FIGS. 9 and 10 are two axial sections, both taken on the line IX—IX of FIG. 5, illustrating the embodiment in two different operating positions.

DESCRIPTION OF THE PREFERRED EMBODIMENTS

Figure 1:
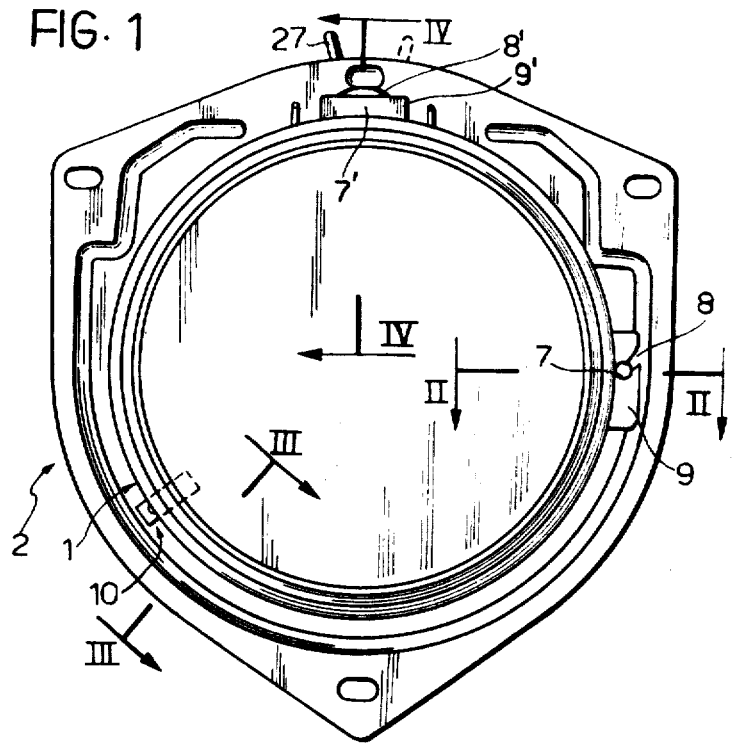
FIG. 1 is a front view of a motor vehicle headlamp having one embodiment of a device for changing its angle to compensate for changes in the angle of the vehicle according to the invention.
Figure 2:
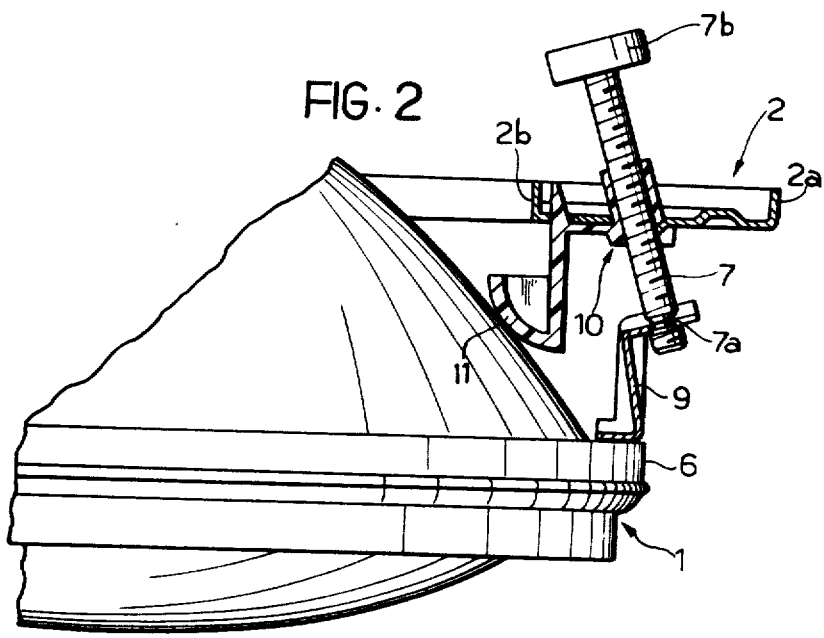

Referring now to the drawings, an optical system 1 of a headlamp for motor vehicles is shown in FIG. 1; the optical system is adjustably mounted in an annular support plate 2 which is attached substantially vertically to the coachwork of a motor vehicle (not shown) and is provided with radially inner and outer flanges 2a and 2b at the peripheral edges thereof.

The optical system is secured at one point to the support plate 2 by means of a helical spring 3 hooked over a rod 4 of the plate 2 and to a corresponding cranked rod 5, welded to a peripheral edge 6 of the optical system, as illustrated in FIG. 3.

The optical system is also connected to the plate 2 by means of a first adjusting screw 7 which has a circumferential groove 7a at one end which engages a notch 8 in another cranked rod 9 welded to the edge 6 of the optical system. The screw 7 is located in a shaped block 10 which is a snap fit in the plate 2. The block 10 has an arcuate heel 11, against which the rear face of the reflector of the optical system is biased by the spring 3.

The screw 7 allows adjustment of the light beam in a horizontal plane by operation of a handgrip 7b formed at the end of the screw 7 remote from the end having the circumferential groove 7a.

A third connection between the optical system and the support plate 2 is formed at the upper edge thereof by means of a device for varying the angle of the lamp with respect to a horizontal plane, generally indicated 12, and illustrated in FIGS. 4 et seq. This connection is formed by means of a second adjusting screw 7' which has a knurled knob 7'b at one end and a circumferential groove 7'a at the other. The circumferential groove 7'a engages a notch 8' of a cranked rod 9' secured to the peripheral edge 6 of the optical system.

The screw 7' engages in a threaded hole 13 in a boss 14 which projects from the connecting bridge of a plastics material U-shaped member 15 located at the rear of the support plate 2 and mounted so as to be movable in the axial direction.

The U-shaped member 15, as shown in FIG. 7, comprises a connecting bridge 16 and two lateral limbs 17, 17' which are provided at their ends with pairs of resilient teeth 18, 18', which allow snap-engagement of the member 15 into two parallel slots 19, 19' on the annular support plate 2. The slots 19, 19' are provided with catch teeth 20, 20' which engage the teeth 18, 18' to provide a secure attachment of the member 15 to the support plate 2. The slots 19, 19' are located in the upper portion of the annular support plate 2 as shown in FIG. 7.

The inner face of the connecting bridge 16 of the U-shaped member 15 which, when assembled, faces the support plate 2, has two inclined surfaces 21, 21' which slope in opposite directions to form two cam faces, one on either side of the central boss 14. Onto the boss 14 is rotatably mounted a control member 22. The control member 22 is pressed out of plastics material, and comprises a tubular bush 23, two symmetrical lateral projections 25, 25' and a central lever 27 which projects rearwardly and is formed with a handle. The two lateral projections 25, 25' are located on assembly, between the two halves of the connecting bridge 16 of the U-shaped member 15 and the annular support plate 2; the faces of the projections 25, 25' which face toward the U-shaped member 15 are formed with inclined surfaces 26 and 26' which slope in opposite directions and which are arranged to cooperate with the inclined surfaces 21, 21' of the U-shaped member 15 to perform a cam action, as will be described in greater detail below.

The front portion 27a of the lever 27 is arranged to co-operate with a protuberance 28 in the support plate 2, which thereby facilitates positioning of the lever into the two operative positions of the device, preventing it from stopping in an intermediate position.

When assembled, the cylindrical bush 23 of the control member 22 extends into a hole 24 in the support plate 2 and assists in locating a support element 29, again formed of plastics material, which comprises a plate 30 provided with a circular hole 31 into which the bush 23 engages, and with a forwardly extending bracket 35 having a small quadrant shaped block 36 upon the arcuate surface of which rests the rear surface of the reflector; the bracket 35 is connected to the plate 30 by means of reinforcing ribs 37. From the rear face of the plate 30 there project further spring teeth 32 which allow snap-in assembly of the element 29 into a slot 33 provided with catch teeth 34 in the support plate 2.

The control member 22 can be rotated about its axis between two operative positions, one of which is illustrated by a plain line and the other by a broken line in FIG. 5. Movement of the control member between the operative positions causes axial movement of the U-shaped member 15 due to the relative movement of the two cam faces 21, 21' and 26, 26' which have a wedge action causing relative separation of the two members 15, 22 on which the said inclined faces are formed when the control member is rotated to one position and allowing relative approach of the two members when the control member is rotated to the other position.

As illustrated in FIGS. 9 and 10, in one operative position of the control member 22 the inclined surfaces 21, 21' of the connecting bridge 16 of the U-shaped member 15 and the inclined surfaces 26, 26' of the lateral projection of the control member are in contact with each other (see FIG. 10) so that the U-shaped member 15 is in the position close to the annular support plate 2: the distance between the plate and the adjacent face of the U-shaped member is shown at A'.

When the control member 22 is moved into the other operative position, the flat parts of the contiguous faces of the two said members are in contact, the U-shaped member is moved away from the annular support plate 2 and its distance from the plate 2 increases as shown at A in FIG. 9.

Movements of the U-shaped member 15 are transferred to the adjusting screw 7' to which is connected the upper portion of the optical system of the headlamp. The two predetermined operative positions of the control member thus correspond to two predetermined positions of the headlamp beam, one for driving with a full load in which the motor vehicle is tilted backwards with respect to its normal position when there is only the driver on board, and one for the latter condition where the angle of the vehicle is normal.

Thus by moving the lever 27 from one operative position to the other the headlamp can be directed at two different angles with respect to a horizontal plane in order to obtain the most reasonable direction of the light beam under the two different load conditions mentioned above.

Naturally the principle of the invention remaining unchanged, the forms of realization and the details of construction may be widely varied in relation to what has been specified and illustrated without, nevertheless, going beyond the scope of this invention.

We claim:
1. In a headlamp of the type comprising an optical system,
    an annular support plate,
    three supports on said annular support plate, said optical system being mounted on said three supports,
    adjusting means on two of said three supports, said adjusting means each including an adjusting screw operating to adjust the inclination of the said headlamp in one of two planes,
    the improvement comprising an adjustment device for adjusting the inclination of the headlamp with respect to the horizontal to compensate for changes of inclination due to changes in load of the vehicle, said adjustment device comprising,
    a U-shaped support member, said U-shaped support member being slidably mounted for axial movement on said annular support plate,
    a threaded boss on said U-shaped support member, one of said adjusting screws engaging in said threaded boss, said adjusting screw controlling the inclination of said headlamp with respect to the horizontal, a rotatably mounted control member, said control member having two lateral projections, said lateral projections being wedge shaped in cross section and interposed between said U-shaped support member and said annular support plate, said control member being rotatable between two operating positions whereby in one said position of said control member said lateral projections cause relative axial separation of said U-shaped support member and said annular support plate by wedging them apart and in the other said position of said control member said lateral projections allow relative approach of said U-shaped support member and said annular support plate thereby adjusting the position of said adjusting screw to adjust the inclination of said headlamp with respect to the horizontal between two predetermined positions.

2. The headlamp adjustment device of claim 1 wherein said limbs of said U-shaped support member are provided with resilient teeth, two slots in said annular support plate, said resilient teeth allowing snap-in assembly of said teeth into said slots in said annular support plate.

3. The headlamp adjustment device of claim 1 wherein said U-shaped support member is linked to one of said three supports of said optical system, said support comprising, a plate, said plate defining a substantially circular hole, a bracket secured to said plate, a shaped block secured to said bracket, said optical system resting against said shaped block, a pair of resilient teeth on said plate, a slot in said annular support plate, said resilient teeth allowing snap assembly of said support into said slot in said annular support plate.

4. The headlamp adjustment device of claim 1, a protuberance on said annular support plate, said control member cooperating with said protuberance to define said two operating positions of said control member.

* * * * *

UNITED STATES PATENT OFFICE
CERTIFICATE OF CORRECTION

Patent No. 3,686,497          Dated   August 22, 1972

Inventor(s) Salvatore Di Salvo, et. al.

It is certified that error appears in the above-identified patent and that said Letters Patent are hereby corrected as shown below:

On the cover sheet, insert -- [73] Assignee: Fiat Societa per Azioni -- .

Signed and sealed this 15th day of May 1973.

(SEAL)
Attest:

EDWARD M. FLETCHER, JR.          ROBERT GOTTSCHALK
Attesting Officer                Commissioner of Patents